(12) United States Patent
Liu et al.

(10) Patent No.: US 10,863,603 B2
(45) Date of Patent: Dec. 8, 2020

(54) POWER SUPPLY APPLIED TO MULTIPLE LOADS, INTEGRATED POWER SUPPLY AND LIGHTING FIXTURE

(71) Applicant: OPPLE LIGHTING CO., LTD., Shanghai (CN)

(72) Inventors: Huan Liu, Shanghai (CN); Zhonghua Sui, Shanghai (CN); Xuejun Feng, Shanghai (CN); Shougang Feng, Shanghai (CN)

(73) Assignee: Opple Lighting Co., Ltd., Shanghai (CN)

( * ) Notice: Subject to any disclaimer, the term of this patent is extended or adjusted under 35 U.S.C. 154(b) by 0 days.

(21) Appl. No.: 16/828,580

(22) Filed: Mar. 24, 2020

(65) Prior Publication Data

US 2020/0229282 A1    Jul. 16, 2020

Related U.S. Application Data

(63) Continuation of application No. PCT/CN2018/107381, filed on Sep. 25, 2018.

(30) Foreign Application Priority Data

Sep. 25, 2017  (CN) .......................... 2017 1 0874812
Sep. 25, 2017  (CN) ..................... 2017 2 1233527 U

(51) Int. Cl.
*H05B 47/10* (2020.01)
*H02M 1/42* (2007.01)
*H02M 1/00* (2006.01)

(52) U.S. Cl.
CPC .......... *H05B 47/10* (2020.01); *H02M 1/4208* (2013.01); *H02M 2001/008* (2013.01)

(58) Field of Classification Search
CPC .... H05B 47/10; H05B 47/19; H05B 45/3725; H05B 45/355; H05B 45/56; H05B 45/37;
(Continued)

(56) References Cited

U.S. PATENT DOCUMENTS 5,986,557 A * 11/1999 Clarke .................. H02H 3/046
                                                        340/638
7,739,626 B2 * 6/2010 Jin .......................... G06F 30/30
                                                        716/138
(Continued)

FOREIGN PATENT DOCUMENTS

CN        103032847 A      4/2013
CN        104837267 A      8/2015
(Continued)

OTHER PUBLICATIONS

International Search Report (with English translation) issued in PCT/CN2018/107381 dated Dec. 27, 2018, (4p).

*Primary Examiner* — Haissa Philogene
(74) *Attorney, Agent, or Firm* — Arch & Lake LLP

(57) ABSTRACT

The present disclosure provides a power supply applied to multiple loads, an integrated power supply and a lighting fixture. The power supply includes a first connector, at least one isolated power supply and at least one non-isolated power supply. The first connector is electrically connected with the at least one isolated power supply and the at least one non-isolated power supply, and is electrically connected with a controller, in order to adjust power states of the at least one isolated power supply and the at least one non-isolated power supply by receiving a power supply control signal from the controller. The at least one isolated power supply and the at least one non-isolated power supply are respectively connected with corresponding load circuit, to supply power to the load circuits, and control working states (Continued)

of the connected load circuits according to the power states thereof.

20 Claims, 3 Drawing Sheets

(58) Field of Classification Search
CPC ............... H02M 1/00; H02M 1/4208; H02M 2001/008; H02M 3/33561; H02M 3/1584; H02M 3/156; H02M 7/003
See application file for complete search history.

(56) References Cited

U.S. PATENT DOCUMENTS

| | | | | |
|---|---|---|---|---|
| 8,713,363 | B2* | 4/2014 | Williams | ............ G06F 11/2015 |
| | | | | 714/14 |
| 9,474,113 | B2* | 10/2016 | Chou | ...................... H05B 45/50 |
| 9,921,640 | B2* | 3/2018 | Zillmann | ............... G06F 1/3296 |
| 9,923,476 | B2* | 3/2018 | Wang | ................ H02M 3/33576 |
| 9,948,222 | B2* | 4/2018 | Abe | ........................ H02J 7/025 |
| 10,193,442 | B2* | 1/2019 | Parto | .......................... G05F 1/46 |

FOREIGN PATENT DOCUMENTS

| | | |
|---|---|---|
| CN | 205883071 U | 1/2017 |
| CN | 107659125 A | 2/2018 |
| CN | 207399015 U | 5/2018 |

\* cited by examiner

POWER SUPPLY APPLIED TO MULTIPLE LOADS, INTEGRATED POWER SUPPLY AND LIGHTING FIXTURE

CROSS-REFERENCE TO RELATED APPLICATIONS

This application is based upon and claims the priority of PCT patent application No. PCT/CN2018/107381 filed on Sep. 25, 2018 which claims the priority of Chinese Patent Application No. 201710874812.2 filed on Sep. 25, 2017 and Chinese Patent Application No. 201721233527.4 filed on Sep. 25, 2017, the entire content of all of which is hereby incorporated by reference herein for all purposes.

TECHNICAL FIELD

Examples of the present disclosure relate to the technical field of lighting, particularly to a power supply applied to multiple loads, an integrated power supply and a lighting fixture.

BACKGROUND

A lighting fixture is generally provided with a plurality of identical or different light source loads (or light source modules) inside at least two independent power supplies plus a controlling module independent from the power supplies are usually employed to control and supply power to the lighting fixture.

SUMMARY

Examples of the present disclosure provide a power supply applied to multiple loads, an integrated power supply and a lighting fixture.

According to a first aspect, the present disclosure provides a power supply applied to multiple loads. The power supply may include a first connector, at least one isolated power supply, and at least one non-isolated power supply parallel with the at least one isolated power supply. The first connector may be electrically connected with the at least one isolated power supply and the at least one non-isolated power supply and may be electrically connected with a controller in order to adjust power states of the at least one isolated power supply and the at least one non-isolated power supply by receiving a power supply control signal from the controller.

The at least one isolated power supply and the at least one non-isolated power supply may be connected with load circuits which correspond to the at least one isolated power supply and the at least one non-isolated power supply, to supply power to the load circuits, and control working states of the load circuits connected to the at least one isolated power supply and the at least one non-isolated power supply according to the power states of the at least one isolated power supply and the at least one non-isolated power supply; and the at least one isolated power supply, the at least one non-isolated power supply and the first connector are arranged on a same circuit board.

According to another aspect of the present disclosure, the present disclosure provides an integrated power supply that may include a housing provided with an external interface, a power supply applied to multiple loads, a circuit board and a controller. The power supply applied to the multiple loads may include at least one isolated power supply and at least one non-isolated power supply, where the at least one isolated power supply and the at least one non-isolated power supply may be accommodated inside the housing and assembled on the circuit board; and the controller may be electrically connected with the circuit board, and may be configured to transmit a power supply control signal into the at least one isolated power supply and/or the at least one non-isolated power supply, in order to control a power state of the at least one isolated power supply and/or a power state of the at least one non-isolated power supply.

According to yet another aspect of the present disclosure, the present disclosure provides a lighting fixture. The lighting fixture may include a plurality of light source devices or a plurality of light source modules; and a power supply applied to multiple loads that may include a first connector, at least one isolated power supply, and at least one non-isolated power supply parallel with the at least one isolated power supply.

The first connector may be electrically connected with the at least one isolated power supply and the at least one non-isolated power supply and may be electrically connected with a controller in order to adjust power states of the at least one isolated power supply and the at least one non-isolated power supply by receiving a power supply control signal from the controller.

The at least one isolated power supply and the at least one non-isolated power supply may be connected with load circuits which correspond to the at least one isolated power supply and the at least one non-isolated power supply, to supply power to the load circuits, and control working states of the load circuits connected to the at least one isolated power supply and the at least one non-isolated power supply according to the power states of the at least one isolated power supply and the at least one non-isolated power supply; and the at least one isolated power supply, the at least one non-isolated power supply and the first connector are arranged on a same circuit board.

The power supply applied to the multiple loads may be connected with the plurality of light source devices or the plurality of light source modules, supplies power to the plurality of light source devices or the plurality of light source modules, and controls working states of the plurality of light source devices or the plurality of light source modules.

It is to be understood that both the foregoing general description and the following detailed description are exemplary and explanatory only and are not restrictive of the present disclosure.

BRIEF DESCRIPTION OF THE DRAWINGS

Various other advantages and benefits will become apparent to those of ordinary skill in the art by reading the detailed description of the examples below. The drawings are only for the purpose of illustrating examples and are not to be considered to limit the present disclosure. And throughout the drawings, the same components are denoted by the same reference numbers.

DETAILED DESCRIPTION

Figure 1:
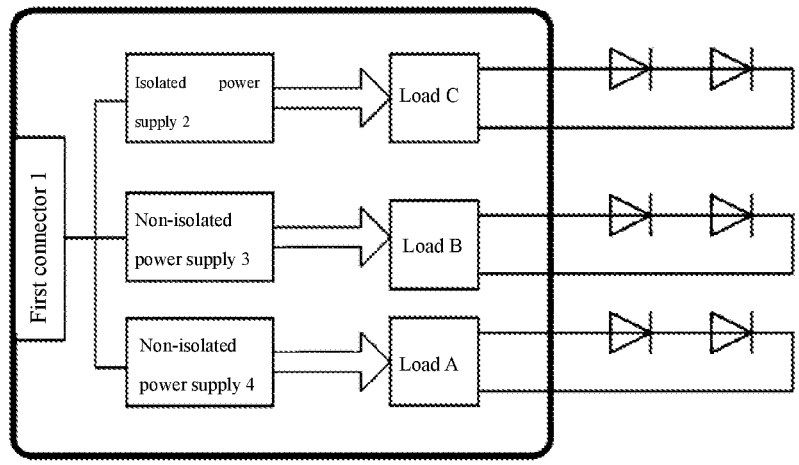
FIG. 1 shows a structural schematic diagram of a power supply applied to multiple loads according to an example of the present disclosure.

Examples of the present disclosure are described in more detail with reference to the accompanying drawings. Although examples of the present disclosure are shown in the drawings, it should be understood that the present disclosure can be implemented in various forms and should not be limited by the examples set forth herein. On the contrary, these examples are provided to enable a thorough understanding of the present disclosure, and to fully convey the scope of the present disclosure to those skilled in the art.

The terminology used in the present disclosure is for the purpose of describing exemplary examples only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," and the like may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

When the power supplies and the controlling module of the lighting fixture are assembled, not only the light source loads need to be separately connected with the corresponding power supplies, but also the controlling module needs to be separately connected with the corresponding power supply, which causes a relatively complicated assembling process and debugging process. If the light source load and the power supply are connected wrong, there will be a power mismatch, so that the light source loads cannot be lit; and if the controlling module and the power supply are connected wrong, a logical mess may occur, so that the light source load cannot be lit.

Thus, in the above-described connecting way, inner wiring of the lighting fixture is complicated and chaotic, so that a wrong connection is prone to occur. Also, since power supplies and light source loads of different lighting fixtures are installed at different positions, complicated wiring may cause EMI (Electromagnetic Interference) in the lighting fixtures.

In order to solve the above-described technical problems, an example of the present disclosure provides a power supply applied to multiple loads, and the power supply may be applied to a lighting system or a lighting fixture provided with multiple light source loads. With reference to FIG. 1, the power supply applied to multiple loads comprises a first connector 1, at least one isolated power supply (an isolated power supply 2 shown in FIG. 1), and at least one non-isolated power supply (a non-isolated power supply 3 and a non-isolated power supply 4 shown in FIG. 1) parallel with the at least one isolated power supply, wherein, the first connector 1 is electrically connected with the at least one isolated power supply and the at least one non-isolated power supply, and is used for being electrically connected with a controller (not shown in FIG. 1), in order to adjust a power state of the at least one isolated power supply and a power state of the at least one non-isolated power supply by receiving a power supply control signal from the controller.

The at least one isolated power supply and the at least one non-isolated power supply are respectively connected with corresponding load circuits, supply power to the load circuits, and control working states of the connected load circuits according to their own power states. In the example, the at least one isolated power supply, the at least one non-isolated power supply and the first connector 1 are all disposed on the same circuit board (not shown in FIG. 1). The at least one isolated power supply and the at least one non-isolated power supply being parallel with each other refers to that an isolated power supply and a non-isolated power supply work independently without influencing each other. In addition, the number of the isolated power supplies and the number of the non-isolated power supplies may be any number, which will not be specifically limited in the example of the present disclosure.

With further reference to FIG. 1, in one example of the present disclosure, three loads, two non-isolated power supplies (i.e., the non-isolated power supplies 3 and 4) and one isolated power supply (the isolated power supply 2) are included in FIG. 1, wherein a load A and a load B are respectively connected with the non-isolated power supply 4 and the non-isolated power supply 3, a load C is connected with the isolated power supply 2, and an isolated zone is formed near the isolated power supply 2 and the load C connected therewith, i.e., the isolated zone of a whole power supply system is located near the isolated power supply and the load C.

In the example of the present disclosure, the isolated power supply and the non-isolated power supply are integrally designed, i.e., both the isolated power supply and the non-isolated power supply are integrated in one power supply, thereby not only meeting safety requirement of the power supply, but also increasing overall working efficiency of the power supply. Moreover, for a circuit having multiple loads, only one power supply is needed to complete power supply and control of the circuit having multiple loads, thus making wiring of the load circuits and the power supply clearer and more concise, which not only facilitates assembling and debugging of the circuit, but also saves assembling time of the power supply. Further, compared to a conventional power supplying manner that a plurality of load circuits use a plurality of power supplies, the example of the present disclosure greatly reduces production cost of the power supply, and saves resources.

Figure 2:
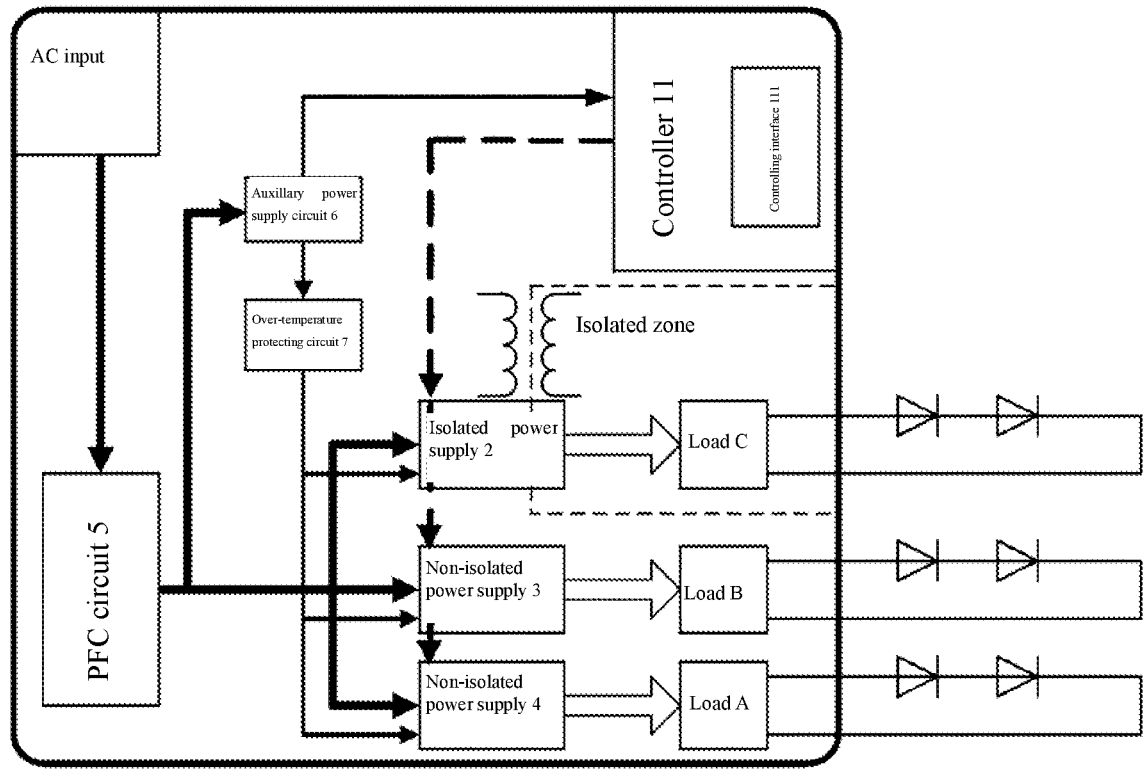
FIG. 2 shows a structural schematic diagram of a power supply applied to multiple loads according to another example of the present disclosure.

With reference to FIG. 2, in one example of the present disclosure, a power supply applied to multiple loads further comprises a controller 11, and the controller 11 is electrically connected with a first connector (not shown in FIG. 2), thereby realizing a connection with an isolated power supply 2, a non-isolated power supply 3 and a non-isolated power supply 4. The controller 11 receives an external control signal from outside, converts the external control signal into a power supply control signal corresponding to each load circuit, and transmits the power supply control signal to at least one isolated power supply (an isolated power supply 2 shown in FIG. 2) and/or at least one non-isolated power supply (a non-isolated power supply 3 and a non-isolated power supply 4 shown in FIG. 2) via the first connector, in order to utilize the power supply control signal to control a power state of the at least one isolated power supply and/or a power state of the at least one non-isolated power supply according to a preset control rule.

In the example, the isolated power supply 2, the non-isolated power supply 3 and the non-isolated power supply 4 are independent from each other. For example, after receiving an external control signal, the controller 11 converts the external control signal into three power supply control signals, and the three power supply control signals are utilized to respectively control power states of the isolated power supply 2, the non-isolated power supply 3 and the non-isolated power supply 4.

In the example, a power state may be an ON/OFF state of an isolated power supply and/or an ON/OFF state of a non-isolated power supply, and may also be a magnitude of output current of the isolated power supply and/or a magnitude of output current of the non-isolated power supply, i.e., the controller 11 may control the ON/OFF state of the isolated power supply and/or the ON/OFF state of the non-isolated power supply, and may also adjust the magnitude of the output current of the isolated power supply and/or the magnitude of the output current of the non-isolated power supply.

In one example of the present disclosure, the controller 11 utilizes a power supply control signal to control a power state of an isolated power supply and/or a power state of a non-isolated power supply according to a preset control rule. Wherein, the preset control rule may be that, after converting an external control signal into a power supply control signal corresponding to each load circuit, the controller 11 utilizes a level property of the power supply control signal to control an ON/OFF state of the isolated power supply and/or an ON/OFF state of the non-isolated power supply, the level property referring to a high/low state of a level.

For example, with reference to FIG. 2, if the power supply control signal is a preset ON level, the controller 11 utilizes the power supply control signal to control the ON/OFF state of the isolated power supply 2 and/or the ON/OFF state the non-isolated power supply 3 (the non-isolated power supply 4) to be an ON state, thus controlling a load circuit C connected with the isolated power supply 2 to work, and/or controlling a load circuit B (A) connected with the non-isolated power supply 3 (the non-isolated power supply 4) to work. If the power supply control signal is a preset OFF level, the controller 11 utilizes the power supply control signal to control the ON/OFF state of the isolated power supply 2 and/or the ON/OFF state the non-isolated power supply 3 (the non-isolated power supply 4) to be an OFF state, thus controlling a load circuit C connected with the isolated power supply 2 to stop working, and/or controlling a load circuit B (A) connected with the non-isolated power supply 3 (the non-isolated power supply 4) to stop working.

Wherein, the preset ON level is an effective level which is preset in advance, for example, a level greater than or equal to 5V is predefined as the effective level, and a magnitude of the preset ON level is 5V. When a level value of the power supply control signal is greater than or equal to 5V, the controller 11 controls the isolated power supply 2 and/or the non-isolated power supply 3 (the non-isolated power supply 4) to be in an ON state. The preset OFF level is an ineffective level which is preset in advance, for example, a level less than 3V is predefined as the ineffective level, and a magnitude of the preset OFF level is 3V. When a level value of the power supply control signal is less than 3V, the controller 11 controls the isolated power supply 2 and/or the non-isolated power supply 3 (the non-isolated power supply 4) to be in an OFF state.

In another example of the present disclosure, the controller 11 utilizes the power supply control signal to respectively control a power state of an isolated power supply and/or a power state of a non-isolated power supply according to a preset control rule. Wherein, the preset control rule may also be that, after converting an external control signal into a power supply control signal corresponding to each load circuit, the controller 11 adjusts a magnitude of output current of the isolated power supply and/or a magnitude of output current of the non-isolated power supply by utilizing a duty ratio of the power supply control signal.

For example, with reference to FIG. 2, if the duty ratio of the power supply control signal changes, the controller 11 may utilize the power supply control signal to adjust a magnitude of output current of the isolated power supply 2 and/or a magnitude of output current of the non-isolated power supply 3 (the non-isolated power supply 4) according to a preset rule. Wherein, the preset rule may be that, when the duty ratio of the power supply control signal increases, the controller 11 adjusts the output current of the isolated power supply 2 and/or the output current of the non-isolated power supply 3 (the non-isolated power supply 4) to increase. Or, the preset rule may also be that, when the duty ratio of the power supply control signal increases, the controller 11 adjusts the output current of the isolated power supply 2 and/or the output current of the non-isolated power supply 3 (the non-isolated power supply 4) to decrease. In practical application, the preset rules may be different for different requirements of the power supplies, and the preset rules mentioned in the example will not be specifically limited in the examples of the present disclosure.

In addition, the controller 11 may also control the power state of the isolated power supply and/or the power state of the non-isolated power supply according to other preset rules, which will not be specifically limited in the examples of the present disclosure.

In one example of the present disclosure, the controller 11 may be provided with a second connector (not shown in FIG. 2), which is electrically connected with an external device (not shown in FIG. 2), to receive a control signal from the external device, and convert the control signal of the external device into a power supply control signal corresponding to each load circuit. For example, the controller 11 may utilize the second connector to receive an ON/OFF sub-control signal of the external device sent by a sub-control switch, and then, the controller 11 converts the ON/OFF sub-control signal, in order to obtain the power supply control signal.

In another example of the present disclosure, the controller 11 is provided with a wireless signal receiver (not shown in FIG. 2), to receive a wireless control signal from an external device, and convert the wireless control signal from the external device into a power supply control signal corresponding to each load circuit. For example, the controller 11 may utilize the wireless signal receiver to receive a wireless control signal sent by an external remote controlling device, and then, the controller 11 converts the wireless control signal to obtain the power supply control signal.

In one example of the present disclosure, the controller 11 is provided with a controlling interface 111, the controlling interface 111 is provided with a third connector (not shown in FIG. 2) therein, and the third connector is butted with a first connector of a power supply, in order to electrically connect the controller with at least one isolated power supply and at least one non-isolated power supply.

Figure 3:
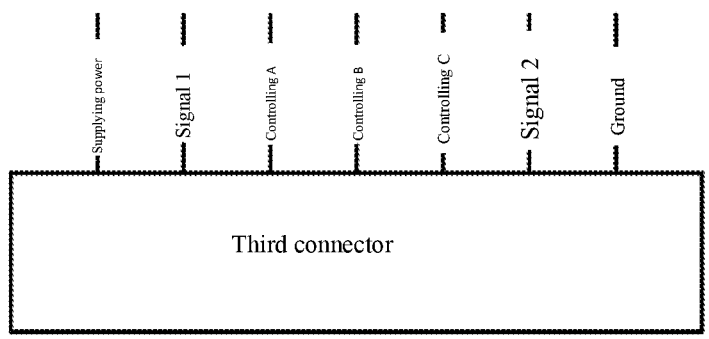
FIG. 3 shows a structural schematic diagram of a third connector according to an example of the present disclosure.

With reference to a third connector shown in FIG. 3, the third connector is provided with a plurality of connecting terminals, and the first connector 1 on the power supply shown in FIG. 1 is also provided with corresponding connecting terminals (not shown in FIG. 1). The plurality of connecting terminals of the third connector include a power supplying terminal, a grounding terminal, three controlling terminals (i.e., three connecting terminals of "control A", "control B" and "control C", the three connecting terminals being respectively used for transmitting power supply control signals converted by a controller 11 into an isolated power supply or a non-isolated power supply to which three load circuits: a load circuit A, a load circuit B and a load circuit C respectively correspond), and two signal terminals (i.e., a "signal 1" terminal and a "signal 2" terminal, the two connecting terminals being used for transmitting a handshaking signal between the isolated power supply or the non-isolated power supply and the controller, and the handshaking signal being an auxiliary signal, to avoid false detection during signal detection). In the example, the number of the connecting terminals provided in the third connector is just illustrative, and will not be specifically limited in the examples of the present disclosure.

With further reference to FIG. 2, in one example of the present disclosure, the power supply may further comprise a Power Factor Correction (PFC) circuit 5 and an auxiliary power supply circuit 6 connected with the PFC circuit 5, wherein, the PFC circuit 5 is used for receiving supplied power of an external power supply (not shown), to supply power to the auxiliary power supply circuit 6, the isolated power supply 2, the non-isolated power supply 3 (the non-isolated power supply 4) and all load circuits, by using the supplied power of the external power supply. The auxiliary power supply circuit 6 is used for receiving supplied power of the PFC circuit 5, to supply power to the isolated power supply 2, the non-isolated power supply 3 (the non-isolated power supply 4) and the controller 11, the isolated power supply 2 and the non-isolated power supply 3 (the non-isolated power supply 4) sharing one PFC circuit 5 and one auxiliary power supply circuit 6.

In the example, the PFC circuit 5 may be a BOOST circuit, i.e., a boost converting circuit. Wherein, a power factor refers to a ratio of effective power divided by total power consumption (apparent power). Basically, the power factor may measure a degree that the power is effectively utilized, and the larger a value of the power factor is, the higher a utilization rate of the power is. A power factor correction is to increase a power factor of an electrical device, i.e., the PFC circuit 5 in the example of the present disclosure is used for increasing a power factor of the isolated power supply and a power factor of a non-isolated power supply.

In one example of the present disclosure, the power supply may further comprise an over-temperature protecting circuit 7, the over-temperature protecting circuit 7 being connected with an auxiliary power supply circuit 6, and used for controlling a power state of the auxiliary power supply circuit 6, in order to prevent an isolated power supply 2, a non-isolated power supply 3 (a non-isolated power supply 4) and a whole circuit from being damaged due to the fact that temperature of the auxiliary power supply circuit 6 is overhigh during working. Specifically, when the temperature of the auxiliary power supply circuit 6 exceeds a preset temperature, power supplied to the isolated power supply 2 and the non-isolated power supply 3 (the non-isolated power supply 4) by the auxiliary power supply circuit 6 is cut off, to make the auxiliary power supply circuit 6 in a state where the power is not provided. Wherein, the preset temperature may be a highest temperature allowable when the auxiliary power supply circuit 6 normally works, and a specific temperature value of the preset temperature needs to be determined according to different specifications of the auxiliary power supply circuits 6, and will not be limited in the examples of the present disclosure.

With reference to FIG. 2, in order to more clearly embody the example of the present disclosure, a power supplying process of the power supply is specifically introduced, wherein, AC input in FIG. 2 refers to supplied power of an external power supply, for example commercial power of 220V.

Figure 4:
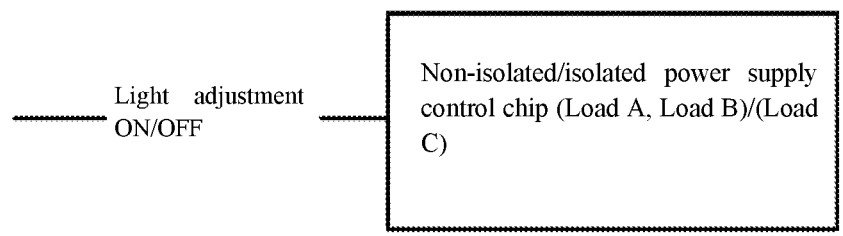
FIG. 4 shows a control schematic diagram of an isolated power supply and a non-isolated power supply according to an example of the present disclosure.

After power is input to power up the power supply by the external power supply, the PFC circuit 5 and the auxiliary power supply circuit 6 are firstly started, and after being started, the auxiliary power supply circuit 6 supplies power to chips of power supplies (the non-isolated power supply 4, the non-isolated power supply 3 and the isolated power supply 2) to which three loads A, B and C correspond, and supplies power to the controller 11. The PFC circuit 5 is a main circuit, and supplies power to the isolated power supply 2, the non-isolated power supply 3 and the non-isolated power supply 4, and then, all the power supplies respectively drive the three loads A, B and C. Wherein, in the example, a load in a load circuit is a light source device or a light source module, and of course, may also be other types of loads, which will not be specifically limited in the examples of the present disclosure. When the load is a light source device or a light source module, the power supply in the example of the present disclosure can control the light source device or the light source module to work or stop working, and can also adjust a magnitude of output current of the light source device or the light source module, thus performing light adjustment, color adjustment and power adjustment on the light source device or the light source module. As shown in FIG. 4, by adjusting current of a non-isolated/isolated power supply control chip, light adjustment is performed on light source devices or light source modules of a load A and a load B or a light source device or a light source module of a load C, and by controlling an ON/OFF state of the non-isolated/isolated power supply control chip, the light source devices or the light source modules of the load A and the load B or the light source device or the light source module the load C are/is controlled to work or not work.

After receiving a wireless control signal or an ON/OFF sub-control signal, the controller 11 converts the wireless control signal or the ON/OFF sub-control signal into three power supply control signals, and the three power supply control signals are respectively transmitted into the isolated power supply 2, the non-isolated power supply 3 and the non-isolated power supply 4 via a first connector and a third connector, in order to control an ON/OFF state and/or a magnitude of output current of each power supply according to a preset control rule. An output current of any one of loads A, B and C may vary along with a changing of a duty ratio of a power supply control signal to adjust an amplitude of the current, i.e., a magnitude of the output current of a load circuit. An ON/OFF state of any one of the loads A, B and C may also be controlled by a preset OFF level and a preset ON level of the power supply control signal. For example, if a duty ratio of a power supply control signal received by the isolated power supply 2 corresponding to the load C increases, output current of the isolated power supply 2 increases, and thereby, output current of the load C adjusted by the isolated power supply 2 also increases, thus adjusting a light emitting effect of the light source device or the light source module of the load C. For another example, if power supply control signals received by the non-isolated power supply 4 and the non-isolated power supply 3 to which the load A and the load B respectively correspond are preset OFF levels, the non-isolated power supply 4 and the non-isolated power supply 3 corresponding to the load A and the load B are turned off, and then the non-isolated power supply 4 and the non-isolated power supply 3 are used to respectively control the load A and the load B to stop working.

It can be seen that, compared with a conventional manner that a plurality of power supplies are employed in a plurality of load circuits to supply power, a power supply of the example of the present disclosure integrates at least one isolated power supply or at least one non-isolated power supply to supply power to multiple loads, all the isolated power supplies or non-isolated power supplies not only can share one input circuit, such as a filtering circuit for performing filtering on alternating current commercial power provided by an external power supply and a PFC circuit, etc., but also can share one auxiliary circuit, such as an auxiliary power supply circuit and an over-temperature protecting circuit, thereby greatly reducing production cost of the power supply. In addition, when a load is a light source device, a combination of various working states of a load circuit can also be realized under a condition that multiple light source loads use one power supply, for example, light emitting effects, ON/OFF states, etc. of light source devices in different load circuits are adjusted simultaneously.

Figure 5:
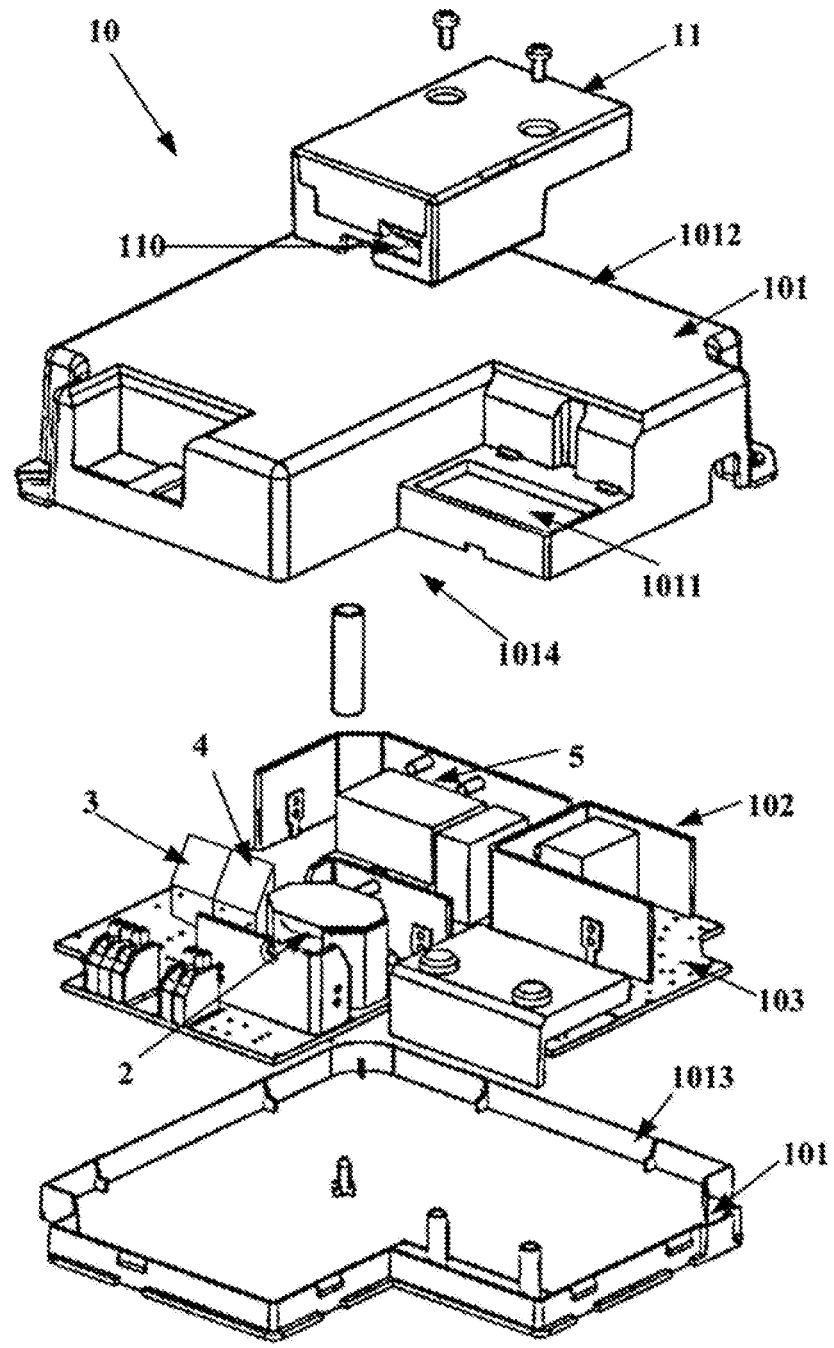
FIG. 5 shows a breakdown structural schematic diagram of an integrated power supply according to an example of the present disclosure.

Based on a same concept, an example of the present disclosure further provides an integrated power supply. With reference to FIG. 5, the integrated power supply 10 comprises a housing 101 provided with an external interface 1011, a power supply 102 applied to multiple loads, a circuit board 103 and a controller 11. Wherein, at least one isolated power supply (an isolated power supply 2 shown in FIG. 5) and at least one non-isolated power supply (a non-isolated power supply 3 and a non-isolated power supply 4 shown in FIG. 5) of the power supply 102 applied to multiple loads are all accommodated in the housing 101 and are assembled on the circuit board 103. The controller 11 is electrically connected with the circuit board 103, and is configured to transmit power supply control signals into the at least one isolated power supply and/or the at least one non-isolated power supply, in order to control a power state of the at least one isolated power supply and/or a power state of the at least one non-isolated power supply.

In one example of the present disclosure, the controller 11 may be installed outside a housing 101, and the example shown in FIG. 5 is a case where the controller 11 is arranged outside the housing 101. A circuit board 103 is provided with a first connector (not shown in FIG. 5), and the first connector is electrically connected with at least one isolated power supply and at least one non-isolated power supply. Correspondingly, the controller 11 is provided with a third connector (not shown in FIG. 5) corresponding to the first connector, and the third connector and the first connector are butted, in order to electrically connect the controller 11 with the at least one isolated power supply and the at least one non-isolated power supply.

In another example of the present disclosure, the controller 11 may also be provided in the housing 101, the controller 11 is integrated on a circuit board 103 and accommodated inside the housing 101, and is electrically connected with at least one isolated power supply and at least one non-isolated power supply through the circuit board 103.

In the example, the housing 101 is in an L shape, therefore forming a gap 1014. A controller 11 has a relatively small size, may be filled into the gap 1014, and is plugged into an integrated power supply 10.

It is illustrated with that an integrated power supply 10 comprises one isolated power supply 2 and two non-isolated power supplies (a non-isolated power supply 3 and a non-isolated power supply 4) as an example in an example hereinafter.

With further reference to FIG. 5, in one example of the present disclosure, since the housing 101 is in the L shape, the housing may include an L-shaped housing top cover 1012 and an L-shaped housing bottom cover 1013; an external interface 1011 is arranged at a position of the gap 1014 of the housing top cover 1012; and after being electrically connected with the circuit board 103, the first connector may be arranged at a position of the external interface 1011 of the housing top cover 1012. A third connector provided on the controller 11 is plugged into the first connector arranged in the external interface 1011. Moreover, the housing top cover 1012 and the housing bottom cover 1013 are snap-fitted to accommodate the isolated power supply 2, the non-isolated power supply 3 and the non-isolated power supply 4 inside the housing 101.

In one example of the present disclosure, a third connector of a controller 11 and a first connector of a circuit board 103 may also be connected through a cable in addition to plugging. Wherein, the cable includes a lead and two connectors respectively provided on two ends of the lead, in order to connect an isolated power supply 2 (or a non-isolated power supply 3, or a non-isolated power supply 4) with the controller 11.

With reference FIG. 5, in one example of the present disclosure, the controller 11 may be provided with a wireless signal receiver 110 for connecting with an antenna, to receive a wireless control signal from an external device, and convert the wireless control signal of the external device into a power supply control signal corresponding to each load circuit. For example, the controller 11 may utilize the wireless signal receiver 110 to receive a wireless control signal sent by an external remote controlling device (not shown in FIG. 5), and then, the controller converts the wireless control signal to obtain a power supply control signal.

In addition, a PFC circuit 5 is also accommodated in a housing 101, and, other circuits comprised by the power supply applied to multiple loads mentioned in the example above, such as an over-temperature protecting circuit (not shown in FIG. 5), an auxiliary power supply circuit (not shown in FIG. 5), etc. may also be accommodated in the housing 101, in order to facilitate wiring and connection between all circuits.

In the example of the present disclosure, when power needs to be supplied to multiple loads, the power may be supplied to the multiple loads only by one integrated power supply. After an external control signal is received by a signal receiving interface of a controller, a load circuit may be further controlled and adjusted. If a load in the load circuit is a light source device, an ON/OFF state, a dark/light state of a color, a bright/dark state of brightness, etc. of the light source device can be controlled.

Based on a same concept, an example of the present disclosure further provides a lighting fixture, comprising a plurality of light source devices or a plurality of light source modules, and an integrated power supply mentioned in any one of examples above, the power supply being connected with the plurality of light source devices or the plurality of light source modules, to supply power to the plurality of light source devices or the plurality of light source modules, and control working states of the plurality of light source devices or the plurality of light source modules.

Wherein, the working states of the plurality of light source devices or the plurality of light source modules include ON/OFF states, dark/light states of colors, bright/dark states of brightness, etc. of the plurality of light source devices or the plurality of light source modules.

In the example of the present disclosure, although the lighting fixture comprises multiple light source loads, only one power supply is employed, and the lighting fixture can achieve various light emitting effects by adjusting a state of the power supply, thus saving cost of the power supply, and then saving production cost of the lighting fixture.

Examples of the present disclosure provide a power supply applied to multiple loads, an integrated power supply and a lighting fixture.

According to a first aspect of the present disclosure, an example of the present disclosure provides a power supply applied to multiple loads, the power supply applied to multiple loads comprises a first connector, at least one isolated power supply, and at least one non-isolated power supply parallel with the at least one isolated power supply, the first connector is electrically connected with the at least one isolated power supply and the at least one non-isolated power supply and is used for being electrically connected with a controller, in order to adjust power states of the at least one isolated power supply and the at least one non-isolated power supply by receiving a power supply control signal from the controller; the at least one isolated power supply and the at least one non-isolated power supply are respectively connected with load circuits which correspond to the at least one isolated power supply and the at least one non-isolated power supply, to supply power to the load circuits, and control working states of the load circuits connected to the at least one isolated power supply and the at least one non-isolated power supply according to the power states of the at least one isolated power supply and the at least one non-isolated power supply; and the at least one isolated power supply, the at least one non-isolated power supply and the first connector are all arranged on a same circuit board.

Optionally, the power supply applied to multiple loads further comprises the controller, the controller is electrically connected with the first connector for receiving an external control signal from outside, converts the external control signal into the power supply control signal corresponding to each of the load circuits, and transmits the power supply control signals to the at least one isolated power supply and/or the at least one non-isolated power supply via the first connector, in order to control the power state of the at least one isolated power supply and/or the power state of the at least one non-isolated power supply by utilizing the power supply control signal according to a preset control rule.

Optionally, the controller is provided with a second controller which is electrically connected with an external device, to receive a control signal from the external device, and convert the control signal from the external device into the power supply control signal corresponding to each of the load circuits; or the controller is provided with a wireless signal receiver, to receive a wireless control signal from an external device, and convert the wireless control signal from the external device into the power supply control signal corresponding to each of the load circuits.

Optionally, the power state includes an ON/OFF state of the at least one isolated power supply and/or an ON/OFF state of the at least one non-isolated power supply; or a magnitude of an output current of the at least one isolated power supply and/or a magnitude of an output current of the at least one non-isolated power supply.

Optionally, after converting the external control signal into the power supply control signal corresponding to each of the load circuits, the controller utilizes a level property of the power supply control signal to control an ON/OFF state of the at least one isolated power supply and/or an ON/OFF state of the at least one non-isolated power supply, and the level property refers to a high-low state of a level.

Optionally, if the power supply control signal is a preset ON level, the controller utilizes the power supply control signal to control the ON/OFF state of the at least one isolated power supply and/or the ON/OFF state of the at least one non-isolated power supply to be an ON state, thus controlling a load circuit connected with the at least one isolated power supply and/or a load circuit connected with the at least one non-isolated power supply to work; if the power supply control signal is a preset OFF level, the controller utilizes the power supply control signal to control the ON/OFF state of the at least one isolated power supply and/or the ON/OFF state of the at least one non-isolated power supply to be an OFF state, thus controlling the load circuit connected with the at least one isolated power supply and/or the load circuit connected with the at least one non-isolated power supply to stop working.

Optionally, after the controller converts the external control signal into the power supply control signal corresponding to each of the load circuits, a duty ratio of the power supply control signal is utilized to adjust a magnitude of an output current of the at least one non-isolated power supply and/or a magnitude of an output current of the at least one non-isolated power supply.

Optionally, if the duty ratio of the power supply control signal changes, the controller utilizes the power supply control signal to adjust the magnitude of the output current of the at least one isolated power supply and/or the magnitude of the output current of the at least one non-isolated power supply according to a preset rule.

Optionally, the controller is further provided with a third connector, and the third connector is butted with the first connector of the power supply, in order to electrically connect the controller with the at least one isolated power supply and/or the at least one non-isolated power supply.

Optionally, the controller includes an interface circuit, the interface circuit is connected with the third connector, and the controller utilizes the interface circuit to convert the external control signal into the power supply control signal corresponding to each of the load circuits, and transmit the power supply control signal to the at least one isolated power supply and/or the at least one non-isolated power supply via the third connector and the first connector.

Optionally, the power supply applied to multiple loads comprises one isolated power supply and two non-isolated power supplies parallel with the isolated power supply, and the isolated power supply and the two non-isolated power supplies are respectively connected with load circuits which correspond to the isolated power supply and the two non-isolated power supplies.

Optionally, the power supply applied to multiple loads further comprises a PFC circuit and an auxiliary power supply circuit connected with the PFC circuit, the PFC circuit receives supplied power of an external power supply, and utilizes the supplied power of the external power supply to supply power to the auxiliary power supply circuit, the at least one isolated power supply, the at least one non-isolated power supply and the load circuits; the auxiliary power supply circuit receives supplied power of the PFC circuit, and supplies power to the at least one isolated power supply, the at least one non-isolated power supply and the controller.

Optionally, the power supply applied to multiple loads further comprises an over-temperature protecting circuit, the over-temperature protecting circuit is connected with the auxiliary power supply circuit to control an output state of the auxiliary power supply circuit, in order to cut off power supplied to the at least one isolated power supply and the at least one non-isolated power supply by the auxiliary power supply circuit when a temperature of the auxiliary power supply circuit exceeds a preset temperature.

Optionally, the external control signal includes a wireless control signal or an ON/OFF sub-control signal sent by an external control device.

Optionally, a load in the load circuit includes a light source device or a light source module.

According to another aspect of the present disclosure, an example of the present disclosure provides an integrated power supply, the integrated power supply comprises a housing provided with an external interface, a power supply applied to multiple loads, a circuit board and a controller, the power supply applied to multiple loads comprises at least one isolated power supply and at least one non-isolated power supply, the at least one isolated power supply and the at least one non-isolated power supply being both accommodated inside the housing and assembled on the circuit board; the controller is electrically connected with the circuit board, and is configured to transmit a power supply control signal into the at least one isolated power supply and/or the at least one non-isolated power supply, in order to control a power state of the at least one isolated power supply and/or a power state of the at least one non-isolated power supply.

Optionally, the controller is integrated on the circuit board and accommodated inside the housing, and realizes an electrical connection with the at least one isolated power supply and the at least one non-isolated power supply through the circuit board.

Optionally, the circuit board is provided with a first connector, the first connector is electrically connected with the at least one isolated power supply and the at least one non-isolated power supply, the controller is provided with a third connector corresponding to the first connector, and the third connector and the first connector are butted, in order to electrically connect the controller with the at least one isolated power supply and the at least one non-isolated power supply.

Optionally, the housing includes a housing top cover and a housing bottom cover, and the first connector electrically connected with the circuit board is arranged on the housing top cover.

According to yet another aspect of the present disclosure, an example of the present disclosure provides a lighting fixture, the lighting fixture comprises: a plurality of light source devices or a plurality of light source modules; the integrated power supply mentioned in any above examples and respectively connected with the plurality of light source devices or the plurality of light source modules, the integrated power supply supplys power to the plurality of light source devices or the plurality of light source modules and controls working states of the plurality of light source devices or the plurality of light source modules.

Optionally, the working states of the plurality of light source devices or the plurality of light source modules include at least one of: ON/OFF states of the plurality of light source devices or the plurality of light source modules; dark/light states of colors of the plurality of light source devices or the plurality of light source modules; and bright/dark states of brightness of the plurality of light source devices or the plurality of light source modules.

In examples of the present disclosure, the power supply applied to multiple loads comprises a first connector, at least one isolated power supply and at least one non-isolated power supply parallel with the at least one isolated power supply, and the at least one isolated power supply, the at least one non-isolated power supply and the first connector are all arranged on a same circuit board. The first connector is electrically connected with the at least one isolated power supply and the at least one non-isolated power supply, and is used for being electrically connected with a controller, in order to adjust power states of the at least one isolated power supply and the at least one non-isolated power supply by receiving a power supply control signal from the controller. The at least one isolated power supply and the at least one non-isolated power supply are respectively connected with load circuits which correspond to the at least one isolated power supply and the at least one non-isolated power supply, to supply power to the load circuits, and control working states of the load circuits connected to the at least one isolated power supply and the at least one non-isolated power supply according to the power states of the at least one isolated power supply and the at least one non-isolated power supply. In the example of the present disclosure, the isolated power supply and the non-isolated power supply are integrally designed, i.e., both the isolated power supply and the non-isolated power supply are integrated in one power supply, thereby not only meeting safety requirement of the power supply, but also increasing overall working efficiency of the power supply. Moreover, for a circuit having multiple loads, only one power supply is needed to complete power supply and control of the circuit having multiple loads, thus making wiring of the load circuits and the power supply more clear and concise, which not only facilitates assembling and debugging of the circuit, but also saves assembling time of the power supply.

Further, compared to a conventional power supplying manner that a plurality of load circuits use a plurality of power supplies, the example of the present disclosure greatly reduces production cost of the power supply, and saves resources.

The above description is only an overview of the technical solution of the present disclosure. In order to understand the technical means of the present disclosure more clearly and implement according to the content of the description, and in order to make the above and other objects, features, and advantages of the present disclosure more clearly, the following examples are listed.

Based on the following detailed description of examples of the present disclosure with reference to the accompanying drawings, those skilled in the art will more clearly understand the above and other objects, advantages and features of the present disclosure.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

Hereto, those skilled in the art should realize that although many examples of the disclosure have been shown and described in great detail herein, without departing from the spirit and scope of the disclosure, many other variations or modifications in accordance with the principles of the disclosure still can be directly determined or derived according to the contents of the disclosure. Therefore, the scope of the disclosure should be understood and deemed to cover all these other variations or modifications.

The invention claimed is:

1. A power supply applied to multiple loads, comprising:
a first connector,
at least one isolated power supply, and
at least one non-isolated power supply parallel with the at least one isolated power supply, wherein:
the first connector is electrically connected with the at least one isolated power supply and the at least one non-isolated power supply and is electrically connected with a controller in order to adjust power states of the at least one isolated power supply and the at least one non-isolated power supply by receiving a power supply control signal from the controller;
the at least one isolated power supply and the at least one non-isolated power supply are connected with load circuits which correspond to the at least one isolated power supply and the at least one non-isolated power supply, to supply power to the load circuits, and control working states of the load circuits connected to the at least one isolated power supply and the at least one non-isolated power supply according to the power states of the at least one isolated power supply and the at least one non-isolated power supply; and
the at least one isolated power supply, the at least one non-isolated power supply and the first connector are arranged on a same circuit board.

2. The power supply applied to the multiple loads according to claim 1, wherein:
the controller, electrically connected with the first connector, is for receiving an external control signal from outside, and converting the external control signal into the power supply control signal corresponding to each of the load circuits, and transmitting the power supply control signals to the at least one isolated power supply and/or the at least one non-isolated power supply via the first connector, in order to control the power state of the at least one isolated power supply and/or the power state of the at least one non-isolated power supply by utilizing the power supply control signal according to a preset control rule.

3. The power supply applied to the multiple loads according to claim 2, wherein:
the controller is provided with a second controller which is electrically connected with an external device to receive a control signal from the external device and convert the control signal from the external device into the power supply control signal corresponding to each of the load circuits; or
the controller is provided with a wireless signal receiver to receive a wireless control signal from an external device and convert the wireless control signal from the external device into the power supply control signal corresponding to each of the load circuits.

4. The power supply applied to the multiple loads according to claim 1, wherein, the power state comprises:
an ON/OFF state of the at least one isolated power supply and/or an ON/OFF state of the at least one non-isolated power supply; and/or
a magnitude of an output current of the at least one isolated power supply and/or a magnitude of an output current of the at least one non-isolated power supply.

5. The power supply applied to the multiple loads according to claim 2, wherein, after converting the external control signal into the power supply control signal corresponding to each of the load circuits, the controller utilizes a level property of the power supply control signal to control an ON/OFF state of the at least one isolated power supply and/or an ON/OFF state of the at least one non-isolated power supply, and wherein the level property refers to a high-low state of a level.

6. The power supply applied to the multiple loads according to the claim 5, wherein, when the power supply control signal is a preset ON level, the controller utilizes the power supply control signal to control the ON/OFF state of the at least one isolated power supply and/or the ON/OFF state of the at least one non-isolated power supply to be an ON state, thus controlling a load circuit connected with the at least one isolated power supply and/or a load circuit connected with the at least one non-isolated power supply to work; and
when the power supply control signal is a preset OFF level, the controller utilizes the power supply control signal to control the ON/OFF state of the at least one isolated power supply and/or the ON/OFF state of the at least one non-isolated power supply to be an OFF state, thus controlling the load circuit connected with the at least one isolated power supply and/or the load circuit connected with the at least one non-isolated power supply to stop working.

7. The power supply applied to the multiple loads according to claim 2, wherein, after the controller converts the external control signal into the power supply control signal corresponding to each of the load circuits, a duty ratio of the power supply control signal is utilized to adjust a magnitude of an output current of the at least one isolated power supply and/or a magnitude of an output current of the at least one non-isolated power supply.

8. The power supply applied to the multiple loads according to claim 7, wherein, when the duty ratio of the power supply control signal changes, the controller utilizes the power supply control signal to adjust the magnitude of the output current of the at least one isolated power supply and/or the magnitude of the output current of the at least one non-isolated power supply according to a preset rule.

9. The power supply applied to the multiple loads according to claim 2, wherein:
the controller is further provided with a third connector, and the third connector is butted with the first connector of the power supply, in order to electrically connect the controller with the at least one isolated power supply and/or the at least one non-isolated power supply.

10. The power supply applied to the multiple loads according to claim 9, wherein:
the controller comprises an interface circuit wherein the interface circuit is connected with the third connector, and the controller utilizes the interface circuit to convert the external control signal into the power supply control signal corresponding to each of the load circuits, and transmit the power supply control signal to the at least one isolated power supply and/or the at least one non-isolated power supply via the third connector and the first connector.

11. The power supply applied to the multiple loads according to claim 1, further comprising:
one isolated power supply and two non-isolated power supplies parallel with the isolated power supply, wherein the isolated power supply and the two non-isolated power supplies are connected with load circuits which correspond to the isolated power supply and the two non-isolated power supplies.

12. The power supply applied to the multiple loads according to claim 2, further comprising a PFC circuit and an auxiliary power supply circuit connected with the PFC circuit, wherein:
the PFC circuit receives supplied power of an external power supply, and utilizes the supplied power of the external power supply to supply power to the auxiliary power supply circuit, the at least one isolated power supply, the at least one non-isolated power supply and the load circuits; and
the auxiliary power supply circuit receives supplied power of the PFC circuit, and supplies power to the at least one isolated power supply, the at least one non-isolated power supply and the controller.

13. The power supply applied to the multiple loads according to claim 12, further comprising:
an over-temperature protecting circuit wherein the over-temperature protecting circuit is connected with the auxiliary power supply circuit to control an output state of the auxiliary power supply circuit in order to cut off power supplied to the at least one isolated power supply and the at least one non-isolated power supply by the auxiliary power supply circuit when a temperature of the auxiliary power supply circuit exceeds a preset temperature.

14. The power supply applied to the multiple loads according to claim 1, wherein a load in the load circuit comprises a light source device or a light source module.

15. An integrated power supply, comprising:
a housing provided with an external interface,
a power supply applied to multiple loads,
a circuit board and a controller; wherein:
the power supply applied to the multiple loads comprises at least one isolated power supply and at least one non-isolated power supply, wherein the at least one isolated power supply and the at least one non-isolated power supply are accommodated inside the housing and assembled on the circuit board, wherein the circuit board is provided with a first connector; and
the controller is electrically connected with the circuit board, and is configured to transmit a power supply control signal into the at least one isolated power supply and/or the at least one non-isolated power supply, in order to control a power state of the at least one isolated power supply and/or a power state of the at least one non-isolated power supply, wherein the controller is provided with a third connector corresponding to the first connector, and the third connector and the first connector are butted.

16. The integrated power supply according to claim 15, wherein:
the controller is integrated on the circuit board and is accommodated inside the housing, and forms an electrical connection with the at least one isolated power supply and the at least one non-isolated power supply through the circuit board.

17. The integrated power supply according to claim 15, wherein:
the first connector is electrically connected with the at least one isolated power supply and the at least one non-isolated power supply; and
the third connector and the first connector are butted in order to electrically connect the controller with the at least one isolated power supply and the at least one non-isolated power supply.

18. The integrated power supply according to claim 17, wherein:
the housing comprises a housing top cover and a housing bottom cover, and the first connector electrically connected with the circuit board is arranged on the housing top cover.

19. A lighting fixture, comprising:
a plurality of light source devices or a plurality of light source modules; and
a power supply applied to multiple loads comprising: a first connector, at least one isolated power supply, and at least one non-isolated power supply parallel with the at least one isolated power supply, wherein:
the first connector is electrically connected with the at least one isolated power supply and the at least one non-isolated power supply and is electrically connected with a controller in order to adjust power states of the at least one isolated power supply and the at least one non-isolated power supply by receiving a power supply control signal from the controller;
the at least one isolated power supply and the at least one non-isolated power supply are connected with load circuits which correspond to the at least one isolated power supply and the at least one non-isolated power supply, to supply power to the load circuits, and control working states of the load circuits connected to the at least one isolated power supply and the at least one non-isolated power supply according to the power states of the at least one isolated power supply and the at least one non-isolated power supply;
the at least one isolated power supply, the at least one non-isolated power supply and the first connector are arranged on a same circuit board; and
the power supply applied to the multiple loads is connected with the plurality of light source devices or the plurality of light source modules, supplies power to the plurality of light source devices or the plurality of light source modules, and controls working states of the plurality of light source devices or the plurality of light source modules.

20. The lighting fixture according to claim 19, wherein the working states of the plurality of light source devices or the plurality of light source modules comprise at least one of:
ON/OFF states of the plurality of light source devices or the plurality of light source modules; dark/light states of colors of the plurality of light source devices or the plurality of light source modules; and bright/dark states of brightness of the plurality of light source devices or the plurality of light source modules.

\* \* \* \* \*